Nov. 27, 1951  D. B. AVERY  2,576,383
MEANS FOR CONNECTING A TRAILER TO A DRAFT VEHICLE
Filed March 30, 1949  2 SHEETS—SHEET 1

INVENTOR.
DALLAS B. AVERY.
BY
ATTORNEY.

Nov. 27, 1951 D. B. AVERY 2,576,383
MEANS FOR CONNECTING A TRAILER TO A DRAFT VEHICLE
Filed March 30, 1949 2 SHEETS—SHEET 2
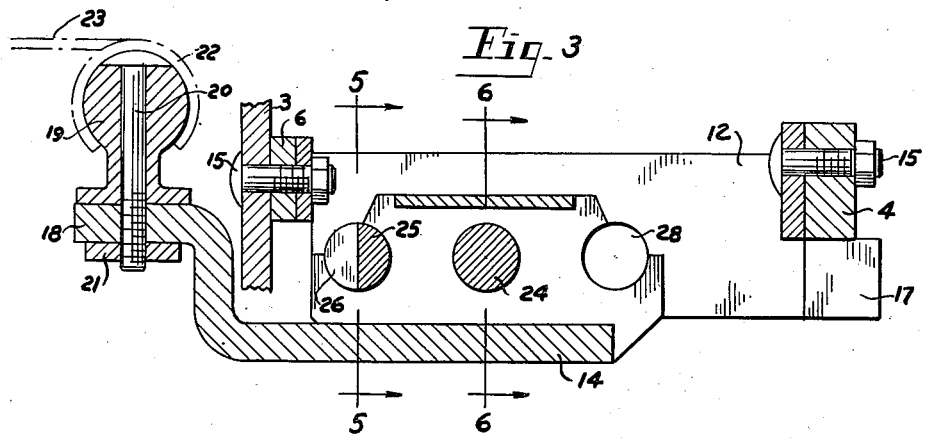
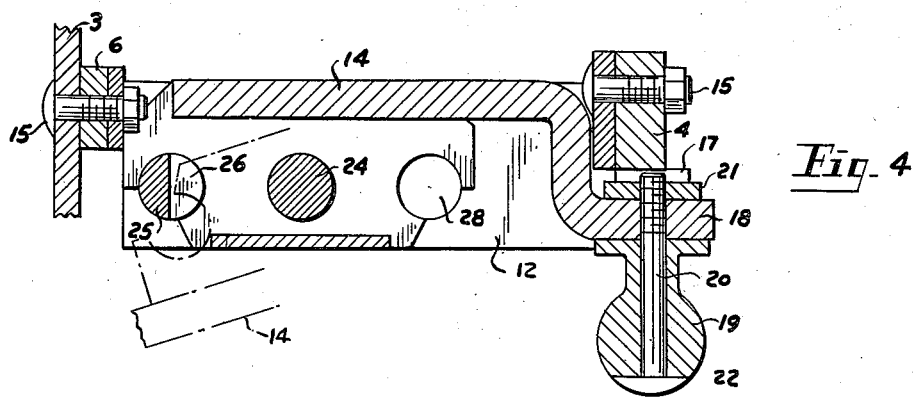
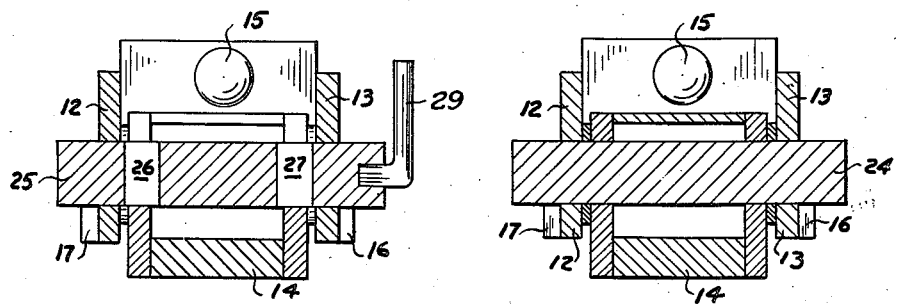
INVENTOR.
DALLAS B. AVERY.
BY
ATTORNEY.

Patented Nov. 27, 1951

2,576,383

UNITED STATES PATENT OFFICE 2,576,383

MEANS FOR CONNECTING A TRAILER TO A DRAFT VEHICLE

Dallas B. Avery, Pontiac, Mich., assignor of one-half to Harvey A. Watson and Loral E. Watson, both of Capac, Mich.

Application March 30, 1949, Serial No. 84,395

2 Claims. (Cl. 280—33.44)

This invention relates to a means for connecting a trailer with a vehicle the object being to provide a device connectable at the rear end of a vehicle, as for instance an automobile or other draft apparatus with which a trailer is connectable, which permits the trailer to assume various angles relative to the draft apparatus due to variations in the road surface.

These and other features and objects of the invention are hereinafter more fully described and shown in the accompanying drawings in which—

Fig. 3 is a section taken on line 3—3 of Fig. 2.

Fig. 4 is a similar section showing the position of the device when not in use.

Fig. 5 is a section taken on line 5—5 of Fig. 3.

Fig. 6 is a section taken on line 6—6 of Fig. 3.

Figure 1:
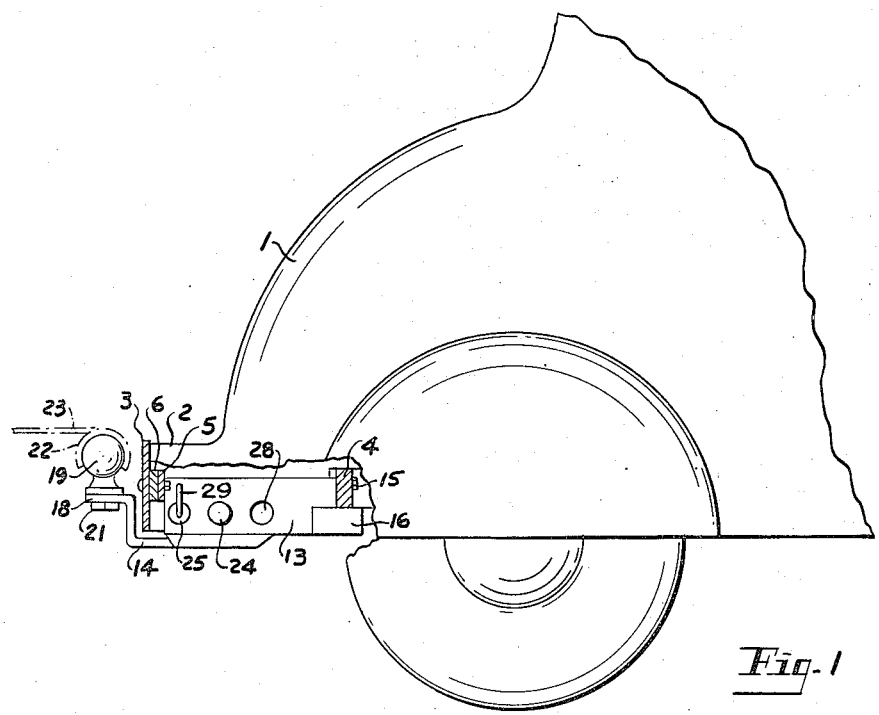
Fig. 1 is an elevation partly in section showing the means for connecting the device to a vehicle.
Figure 2:
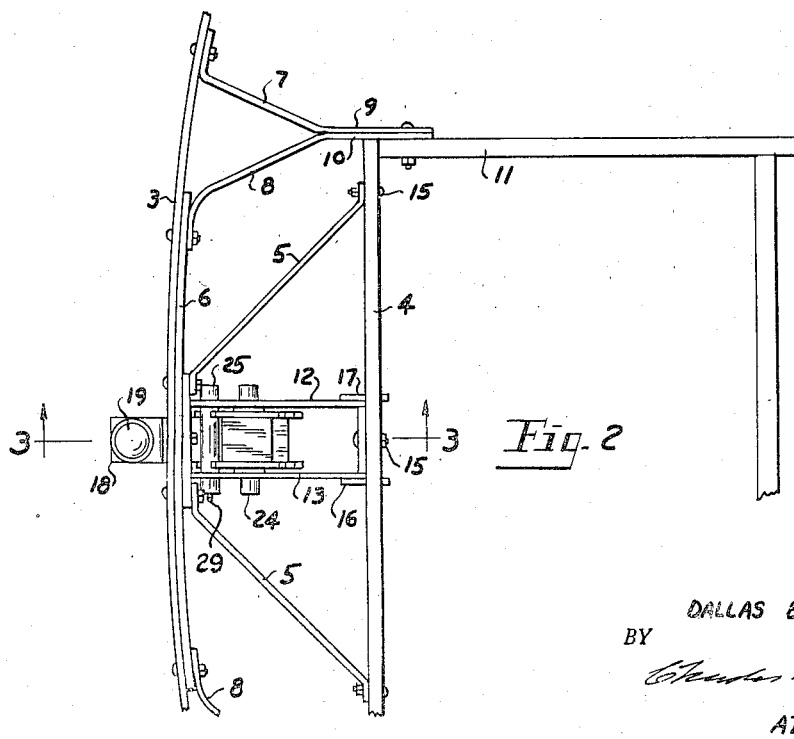
Fig. 2 is a plan view of the apparatus, the vehicle body not being shown.

In Figs. 1 and 2 is shown a portion 4 of the vehicle body 1 and at the outer and lower end of the body is an extension 2 to which a bumper 3 is connected. The portion indicated at 4 has oppositely inclined brace bars 5 which extend from the portion 4 to the inner face of the plate 6, are preferably of the same width as member 3 and are attached thereto. At each end of the bumper 3 is a brace bar 7 and a similar brace bar 8 extends at an angle to the bar 7 and is attached to the member 6 on the inner face of the bumper.

The bars 7 and 8 have similar end portions 9 and 10 secured to a side frame 11 of the vehicle and similar members are provided at the opposite end of the bumper not shown in the drawing.

Supported in the side walls 12 and 13 is a hinge pin 24 extending therethrough. The member 14, when in the position shown in Fig. 4, may be turned on the pin 24 to the position shown in Fig. 1. A similarly supported pin 25, which has spaced transverse slots 26 and 27, is turnable by means of the lever 29. With the parts in the inoperative position shown in Fig. 4 the member 14 carrying the ball 19 is turnable on the pin 24 to the position shown in Fig. 3 and, in so turning the member 14, the ends of the side walls 12 and 13 pass through the slots 26 and 27 in the pin 25. When the member 14 is in the position shown in Fig. 4 the pin 25 may be turned to the position shown in Fig. 3 thereby locking the parts in position for use or reversely turned when not in use as shown in Fig. 4.

Between the chassis frame 4 and the bumper is my trailer connecting device which comprises a frame having two side walls 12 and 13 and integral with the side walls 12 and 13 is a base 29 secured to the chassis frame 4 as by means of a bolt 15 and secured to the frame member 4 are rearwardly extending pin like elements 16 and 17 respectively engaging the side walls 12 and 13 of a frame between the chassis frame 4 and the member 6 on the inner side of the bumper 3. The elements 16 and 17 in addition to the pin 15 serve to prevent lateral displacement of the frame. Member 14 has an upturned and outturned end 18 and supported on the end 18 is a ball like element 19 secured in position thereon by a pin 20 which, as shown in Figs. 1 and 3, extends through an aperture provided in the said end 18 and is secured in position at the lower end by a nut 21. The ball is positioned in a socket 22 connected with a trailing vehicle by the member 23 as more particularly shown in Fig. 1.

As shown in Fig. 3, the ball end is in position for use and, when not in use, the member 14 is positioned on the under side of the frame element 4 of the vehicle chassis as shown in Fig. 4. In moving the member 14 to the left, from the position of Fig. 4 to the position of Fig. 3, the edges of the side walls 12 and 13 pass through the slots 26 and 27 in the pin 25 and when the pin is turned to the position shown in Fig. 3 the member 14 cannot be turned on the hinge pin 24. For safety's sake in pulling a load an aperture 28 is provided in each of the side walls 12 and 13 to receive a solid pin, not here shown.

The ball 19 is positioned in a socket 22 provided therefor in an instrumentality 23 at the rear of the draft vehicle.

It is believed obvious from the above description taken in conjunction with the drawing that the various features and objects of the invention are attained by the structural arrangement and relationship of parts.

Having thus briefly described my invention, its utility and mode of operation, what I claim and desire to secure by Letters Patent of the United States is:

1. Means for connecting a trailer with a draft vehicle comprising a hollow rectangular frame connected at one end to the rear frame of the vehicle and at the other end to the bumper, the frame having aligned apertures in its opposite side walls, a pivot pin extending through a pair of said apertures, a member with a ball end having spaced upright flanges with a corresponding pair of aligned apertures through which said pin extends for pivotally mounting said member upon said frame, each of said flanges having an arcuate notch near one of its ends, said notches being transversely aligned, a locking pin extending through a second pair of frame apertures and through said flange notches and having transverse slots in horizontally spaced parallel relation, means for turning said locking pin whereby said slots may be aligned to receive the outer edges of said flanges to thereby permit the member having a ball end to be pivoted about said first pin from operative to non-operative position each of said flanges having an arcuate notch near the other of its ends, said latter notches being transversely aligned to cooperatively receive said locking pin whereby said ball member may be locked in operative position.

2. Means for connecting a trailer with a draft vehicle comprising a pair of parallel spaced members secured to the draft vehicle, a member with a ball end having spaced flanges adjacent its other end positioned between said parallel members, a pivot pin extending through corresponding openings in said flanges and said parallel members, each of said flanges having an arcuate notch in one edge near one of its ends, said notches being transversely aligned, a locking pin spaced from said pivot pin and extending through said notches and through corresponding openings in said parallel members, said locking pin having parallel spaced slots, projecting means on said locking pin for positioning the base of said slots parallel with the edge of said flanges to permit turning of said member to inoperative position, and positioning the base of said slots at an angle to the edges of said flanges to pervent turning of said member, each of said flanges having an arcuate notch near the other of its ends, said latter notches being transversely aligned to cooperatively receive said locking pin whereby said ball member may be locked in inoperative position.

DALLAS B. AVERY.

REFERENCES CITED

The following references are of record in the file of this patent:

UNITED STATES PATENTS

| Number | Name | Date |
|---|---|---|
| 2,408,531 | Riemann et al. | Oct. 1, 1946 |